(12) United States Patent
Bak et al.

(10) Patent No.: US 10,735,688 B2
(45) Date of Patent: Aug. 4, 2020

(54) ELECTRONICS APPARATUS, DISPLAY APPARATUS AND CONTROL METHOD THEREOF

(71) Applicant: SAMSUNG ELECTRONICS CO., LTD., Suwon-si, Gyeonggi-do (KR)

(72) Inventors: Bong-gil Bak, Suwon-si (KR); Byoung-jin Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/004,852

(22) Filed: Jun. 11, 2018

(65) Prior Publication Data

US 2019/0020852 A1   Jan. 17, 2019

Related U.S. Application Data

(60) Provisional application No. 62/531,932, filed on Jul. 13, 2017, provisional application No. 62/553,937, filed on Sep. 4, 2017.

(30) Foreign Application Priority Data

Feb. 27, 2018   (KR) .................. 10-2018-0023861

(51) Int. Cl.
*H04N 7/035* (2006.01)
*H04N 9/64* (2006.01)
(Continued)

(52) U.S. Cl.
CPC ............... *H04N 7/035* (2013.01); *G09G 5/00* (2013.01); *G09G 5/005* (2013.01); *G09G 5/12* (2013.01);
(Continued)

(58) Field of Classification Search
CPC ............ H04N 7/035; H04N 5/57; H04N 9/64; H04N 21/4122; H04N 21/43;
(Continued)

(56) References Cited

U.S. PATENT DOCUMENTS

2011/0145150 A1   6/2011  Onischuk
2012/0287350 A1   11/2012 Song et al.
(Continued)

FOREIGN PATENT DOCUMENTS

KR   10-2016-0040981   4/2016
KR   10-2016-0051821   5/2016
(Continued)

*Primary Examiner* — Michael Lee
(74) *Attorney, Agent, or Firm* — Nixon & Vanderhye P.C.

(57) ABSTRACT

An electronic apparatus is provided. The electronic apparatus according to an example embodiment includes a communication interface and a processor configured to provide a video content and dynamic metadata corresponding to each content section of the video content to an external display apparatus through the communication interface, each content section comprising a plurality of frames, wherein the processor is further configured to transmit the dynamic metadata to the external display apparatus on a frame-by-frame basis, and based on a graphic content being activated, provide data to the display apparatus by converting dynamic metadata corresponding to a content section where the graphic content is activated into static metadata during a plurality of frames.

16 Claims, 17 Drawing Sheets

(51) Int. Cl.
  *H04N 5/57* (2006.01)
  *G09G 5/14* (2006.01)
  *G09G 5/00* (2006.01)
  *H04N 21/43* (2011.01)
  *H04N 21/845* (2011.01)
  *H04N 21/41* (2011.01)
  *H04N 21/432* (2011.01)
  *G09G 5/12* (2006.01)
  *H04N 21/431* (2011.01)

(52) U.S. Cl.
  CPC ............... *G09G 5/14* (2013.01); *H04N 5/57* (2013.01); *H04N 9/64* (2013.01); *H04N 21/4122* (2013.01); *H04N 21/43* (2013.01); *H04N 21/4318* (2013.01); *H04N 21/4325* (2013.01); *H04N 21/8456* (2013.01); *G09G 2320/0238* (2013.01); *G09G 2320/0686* (2013.01)

(58) Field of Classification Search
  CPC .......... H04N 21/4318; H04N 21/4325; H04N 21/5486; G09G 5/00; G09G 5/005; G09G 5/12; G09G 5/14; G09G 2320/0238; G09G 2320/0686
  USPC ........................................................ 348/453
  See application file for complete search history.

(56) References Cited

U.S. PATENT DOCUMENTS

| | | |
|---|---|---|
| 2015/0071537 A1 | 3/2015 | Lim et al. |
| 2017/0251161 A1* | 8/2017 | Toma ..................... H04N 5/765 |
| 2018/0018932 A1* | 1/2018 | Atkins ..................... G09G 5/10 |
| 2018/0025477 A1 | 1/2018 | Min et al. |
| 2018/0048845 A1* | 2/2018 | Kozuka ..................... H04N 5/20 |
| 2018/0139429 A1* | 5/2018 | Park ........................ G09G 5/005 |
| 2018/0213299 A1* | 7/2018 | Park ........................ H04N 21/84 |
| 2018/0220172 A1* | 8/2018 | Oh ........................ H04N 21/236 |

FOREIGN PATENT DOCUMENTS

| | | |
|---|---|---|
| KR | 10-2017-0107487 | 9/2017 |
| KR | 10-1787788 | 10/2017 |
| WO | 2011/102887 | 8/2011 |

* cited by examiner

FIG. 5A

| Byte | bit | | | | | | | |
|---|---|---|---|---|---|---|---|---|
| | 7 | 6 | 5 | 4 | 3 | 2 | 1 | 0 |
| HB0 | 7 | VSIF type code (=0x01) | | | | | | |
| HB1 | VSIF version (=0x01) | | | | | | | |
| HB2 | 0 | 0 | 0 | Length (max 27) | | | | |
| PB00 | Check-Sum | | | | | | | |
| PB01 | 0x8B | IEEE 24bit code (least significant byte first) | | | | | | |
| PB02 | 0x84 | | | | | | | |
| PB03 | 0x90 | | | | | | | |
| PB04 | application_version [1...0] | targeted_system_display_maximum_luminance [4...0] | | | | | | reserved |
| PB05 | average_maxrgb[7...0] | | | | | | | |
| PB06 | distribution_values [0] [@1%] [7...0] | | | | | | | |
| PB07 | distribution_values [1] (DistributionY99) [7...0] | | | | | | | |
| PB08 | distribution_values [2] (DistributionY100 cd/m²) [7...0] | | | | | | | |
| PB09 | distribution_values [3] [@25%] [7...0] | | | | | | | |
| PB10 | distribution_values [4] [@50%] [7...0] | | | | | | | |
| PB11 | distribution_values [5] [@75%] [7...0] | | | | | | | |
| PB12 | distribution_values [6] [@90%] [7...0] | | | | | | | |
| PB13 | distribution_values [7] [@95%] [7...0] | | | | | | | |
| PB14 | distribution_values [8] [@99.98%] [7...0] | | | | | | | |
| PB15 | num_bezier_curve_anchors [3...0] | | | | knee_point_x [9..6] | | | |
| PB16 | knee_point_x [5...0] | | | | | | knee_point_y [9...8] | |
| PB17 | knee_point_y [7...0] | | | | | | | |
| PB18 | bezier_curve_anchors[0] [7...0] | | | | | | | |
| PB19 | bezier_curve_anchors[1] [7...0] | | | | | | | |
| PB20 | bezier_curve_anchors[2] [7...0] | | | | | | | |
| PB21 | bezier_curve_anchors[3] [7...0] | | | | | | | |
| PB22 | bezier_curve_anchors[4] [7...0] | | | | | | | |
| PB23 | bezier_curve_anchors[5] [7...0] | | | | | | | |
| PB24 | bezier_curve_anchors[6] [7...0] | | | | | | | |
| PB25 | bezier_curve_anchors[7] [7...0] | | | | | | | |
| PB26 | bezier_curve_anchors[8] [7...0] | | | | | | | |
| PB27 | graphics_overlay_flag | reserved [6...0] | | | | | | |

| [i] | distribution_index[w][i] | distribution_values[w][i] |
|---|---|---|
| 0 | 1 | SHALL be converted as: 0.01*maxDML |
| 1 | 5 | SHALL be converted as a smaller valid value between MDML and MaxCLL[8] |
| 2 | 10 | SHALL be converted as 0 |
| 1 | 25 | SHALL be converted as: 0.25*maxDML |
| 4 | 50 | SHALL be converted as: 0.50*maxDML |
| 5 | 75 | SHALL be converted as: 0.75*maxDML |
| 6 | 90 | SHALL be converted as: 0.90*maxDML |
| 7 | 95 | SHALL be converted as: 0.95*maxDML |
| 8 | 99 | SHALL be converted as maxDML |

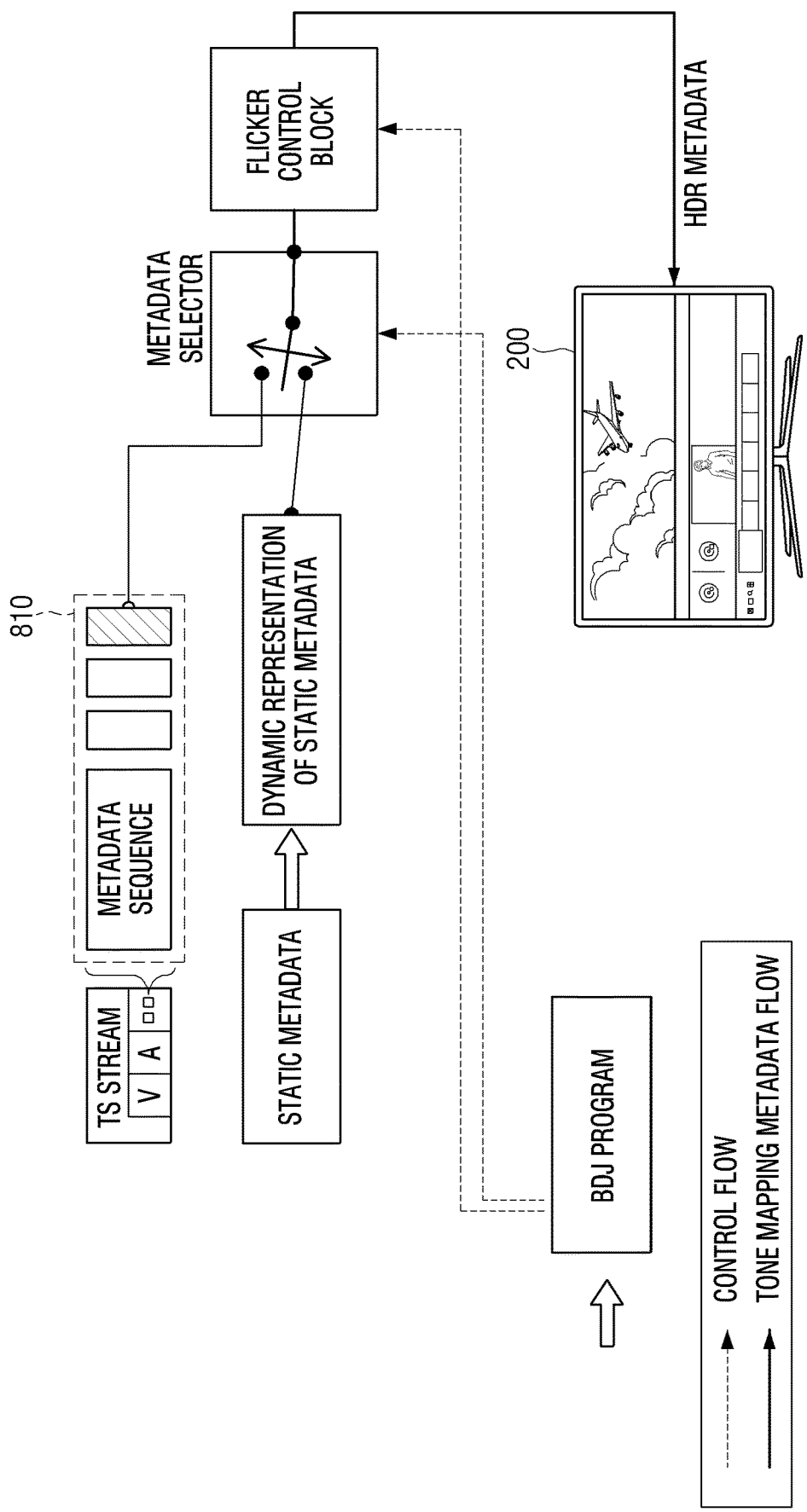

ELECTRONICS APPARATUS, DISPLAY APPARATUS AND CONTROL METHOD THEREOF

CROSS-REFERENCE TO RELATED APPLICATIONS

This application is based on and claims priority under 35 U.S.C. § 119 to Korean Patent Application No. 10-2018-0023861, filed on Feb. 27, 2018, in the Korean Intellectual Property Office, and to U.S. Provisional Patent Application No. 62/531,932 filed Jul. 13, 2017 and 62/553,937 filed Sep. 4, 2017, the disclosures of which are incorporated by reference herein in their entireties.

BACKGROUND

1. Field

Devices and methods consistent with what is disclosed herein relate to a display apparatus and a control method thereof, and more particularly, to an electronic apparatus that reproduces a video content, a display apparatus and/or a control method thereof.

2. Description of Related Art

With the development of electronic technology, various types of electronic apparatuses have been developed and widely used. Particularly, over the recent years, many efforts have been made to display apparatuses used in various places such as homes, offices, public places, or the like.

Recently, for High Dynamic Range (HDR) content, a technique has been widely used for providing a much clearer image by performing an image processing of each scene of HDR content based on dynamic metadata that reflects the characteristic of each scene of the HDR content. However, there is a problem that when a graphic menu is provided in the middle of displaying the HDR content, a brightness level of the graphic menu is also changed.

SUMMARY

An aspect of the exemplary embodiments relates to an electronic apparatus that reproduces a video content to maintain brightness and color of a graphic content when the graphic content is provided while a video content based on dynamic data is reproduced, a display apparatus and an image processing method.

According to an exemplary embodiment, there is provided an electronic apparatus including a communication interface including interface circuitry, and a processor (including processing circuitry) configured to provide a video content and dynamic metadata corresponding to each content section of the video content to an external display apparatus (including a display panel) through the communication interface, each content section comprising a plurality of frames, wherein the processor is further configured to transmit the dynamic metadata to the external display apparatus on a frame-by-frame basis, and based on a graphic content being activated, provide data to the display apparatus by converting dynamic metadata corresponding to a content section where the graphic content is activated into static metadata during a plurality of frames.

The processor may be further configured to provide data to the display apparatus by gradually converting the dynamic metadata into the static metadata during the plurality of frames.

The static metadata may be tone mapping control data that maintains a fixed value which is not changed according to the content section.

The processor may be further configured to obtain metadata corresponding to each of the plurality of frames included in the content section by applying a predetermined weight value to metadata corresponding to each previous frame.

The processor may be further configured to call an Application Programming Interface (API) included in the video content, and determine whether the graphic content is activated based on mode information included in the API.

The processor may be further configured to obtain the metadata corresponding to each of the plurality of frames included in the content section by calculating a sum of a value obtained by applying a predetermined first weight value to metadata corresponding to the previous frame and a value obtained by applying a second weight value to predetermined reference data.

Metadata corresponding to a first frame of the plurality of frames may be the dynamic metadata corresponding to the content section where the graphic content is activated, and wherein metadata corresponding to a last frame of the plurality of frames is or includes data obtained by converting the dynamic metadata based on static metadata of at least one of the video content and the graphic content.

Metadata corresponding to a last frame may be data obtained by replacing at least a part of at least one of brightness information of a content, tone mapping information, maximum brightness information of a mastering monitor and RBG information of a content included in the dynamic metadata with at least a part of at least one of maximum brightness information of a content and maximum brightness information of a mastering monitor included in the static metadata.

The processor may be further configured to obtain metadata corresponding to a last frame by acquiring a calculation value by calculating at least a part of maximum brightness information of a content and maximum brightness information of a mastering monitor included in the static metadata according to a predetermined formula, and replacing at least a part of brightness information of a content, tone-mapping information, maximum brightness information of a mastering monitor, and RGB information of a content included in the dynamic metadata with the acquired calculation value.

The processor may be further configured to, based on the graphic content being inactivated, provide data to the display apparatus by gradually converting the static metadata into dynamic metadata corresponding to each content section during a plurality of frames.

The graphic content may include at least one of interactive graphic (IG), presentation graphic (PG) and graphical user interface (GUI).

According to an exemplary embodiment, there is provided a display apparatus including a communication interface including interface circuitry, a display; and a processor (including processing circuitry) configured to receive a video content and dynamic metadata corresponding to each content section of the video content on a frame-by-frame basis from an external electronic apparatus through the communication interface, process the video content based on the dynamic metadata and display the processed video content through the display, wherein the processor is further configured to, based on a graphic content being activated, convert dynamic metadata corresponding to a content section where the graphic content is activated into static metadata during a plurality of frames and process the video content.

According to an exemplary embodiment, there is provided a controlling method for an electronic apparatus, the method comprising providing a video content and dynamic metadata corresponding to each content section of the video content to an external display apparatus (including a display panel) on a frame-by-frame basis, and based on a graphic content being activated, providing to the display apparatus by converting dynamic metadata corresponding to a content section where the graphic content is activated into static metadata during a plurality of frames.

The providing to the display apparatus may include providing to the display apparatus by gradually converting the dynamic metadata into the static metadata during the plurality of frames.

The providing to the display apparatus may include obtaining metadata corresponding to each of the plurality of frames by applying a predetermined weight value to metadata corresponding to each previous frame.

The providing to the display apparatus may include calling an Application Programming Interface (API) included in the video content, and identifying whether the graphic content is activated based on mode information included in the API.

The providing to the display apparatus may include obtaining the metadata corresponding to each of the plurality of frames by calculating a sum of a value obtained by applying a predetermined first weight value metadata corresponding to the previous frame, and a value obtained by applying a second weight value to predetermined reference data.

Metadata corresponding to a first frame of the plurality of frames may be the dynamic metadata corresponding to the content section where the graphic content is activated, and wherein metadata corresponding to a last frame of the plurality of frames is or includes data obtained by converting the dynamic metadata based on static metadata of at least one of the video content and the graphic content.

Metadata corresponding to a last frame may be data obtained by replacing at least a part of brightness information of a content, tone-mapping information, maximum brightness information of a mastering monitor, and RGB information of a content included in the dynamic metadata with at least a part of maximum brightness information and maximum brightness information of a mastering monitor included in the static metadata.

The providing to the display apparatus may include obtaining metadata corresponding to a last frame by acquiring a calculation value by calculating at least a part of maximum brightness information of a content and maximum brightness information of a mastering monitor included in the static metadata according to a predetermined formula, and replacing at least a part of brightness information of a content, tone-mapping information, maximum brightness information of a mastering monitor, RGB information of a content included in the dynamic metadata with the acquired calculation value.

According to various embodiments, when a graphic content is provided while a video content is reproduced based on dynamic metadata, a user is provided with a graphic content that maintains the brightness and color of a graphic content by receiving converted metadata.

In addition, smooth transition of metadata prevents or reduces image degradation phenomenon such as flicker operation, sudden drop, etc.

BRIEF DESCRIPTION OF THE DRAWINGS

The above and other aspects, features and advantages of certain embodiments of the present disclosure will be more apparent from the following detailed description, taken in conjunction with the accompanying drawings, wherein:

FIG. 5A is a view provided to explain an example embodiment of dynamic metadata according to an embodiment of the present disclosure;

FIG. 5B is a view provided to explain an example embodiment of metadata based on graphic content according to an embodiment of the present disclosure;

FIGS. 8A and 8B are views provided to explain a tone mapping mode transition method according to an embodiment of the present disclosure;

DETAILED DESCRIPTION

Figure 1:
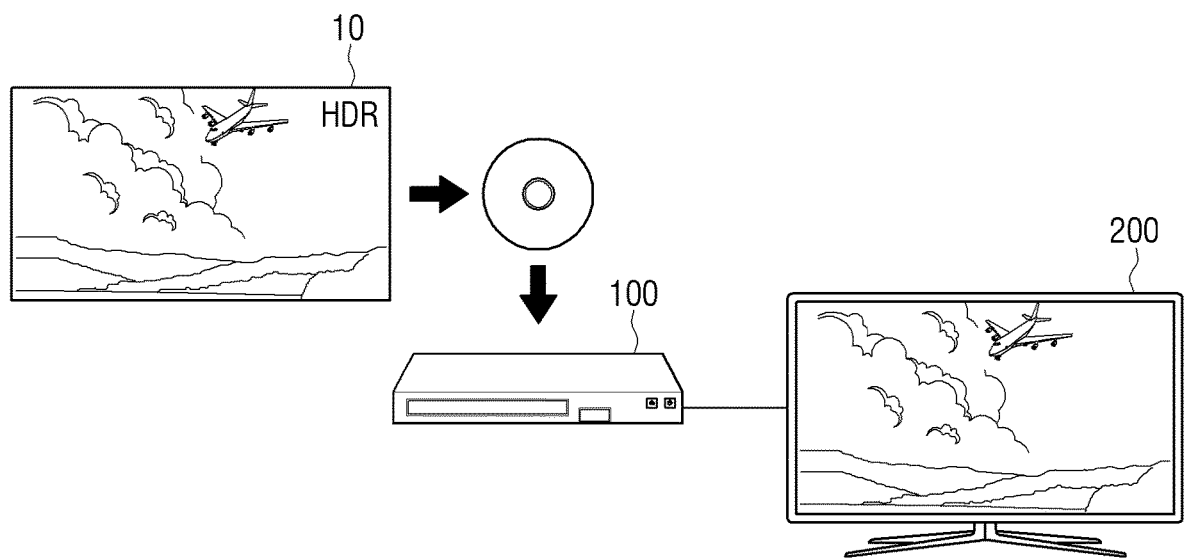
FIG. 1 is a mimetic diagram illustrating an example embodiment of a contents reproduction system according to an embodiment of the present disclosure.

Hereinafter, embodiments of the present disclosure will be described in detail with reference to the accompanying drawings.

The terms used in this specification will be briefly described, and the present disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The invention is not limited to an embodiment disclosed below and may be implemented in various forms and the scope of the invention is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

It should be understood that the expression at least one of A and B represents either "A" or "B" or any one of "A and B".

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the present disclosure will be described in detail with reference to the accompanying drawings so that those skilled in the art can easily carry out the present invention. However, the present disclosure may be embodied in many different forms and is not limited to the embodiments described herein. In order to clearly illustrate the present disclosure in the drawings, some of the elements that are not essential to the complete understanding of the disclosure are omitted for clarity, and like reference numerals refer to like elements throughout the specification.

FIG. 1 is a mimetic view provided to explain an example embodiment of a contents reproduction system according to an embodiment of the present disclosure.

Typically, a content creator may provide a content encoded based on brightness or color of an image as intended. In the case of High Dynamic Range (HDR) content that provides much clearer image quality by increasing a contrast ratio of a screen, encoding information corresponding to an encoding method may be provided together. For example, according to a next-generation optical disc storage medium standard such as Blu-ray Disc (hereinafter, BD), a content encoded based on the brightness, color, etc. of an image as intended by a content creator may be provided together with relevant metadata.

For example, as shown in FIG. 1, when a HDR content 10 is recorded in an optical disc 20 (e.g., Blu-ray Disc), reproduced by an electronic apparatus 100 and displayed through a display apparatus 200, the electronic apparatus 100 may be, for example, a Blu-ray player, a DVD (Digital Versatile Disc) player, or the like, but may be embodied as various types of reproduction devices (or source devices). The display apparatus 200 may be, for example, a TV including a flat or bent/bendable display panel such as an LCD or OLED based display panel. However, the present disclosure is not limited thereto, as the display apparatus 200 may be embodied as various devices capable of displaying such as a head mounted display (HMD), a near eye display (NED), a large format display (LFD), a digital signage, a digital information display (DID), a video wall, and the like.

When the electronic apparatus 100 reproduces the optical disc 20, the HDR content 20 may be provided to the display apparatus 200 together with metadata corresponding thereto (e.g., brightness information of a content (maximum brightness, average brightness, etc.), brightness information of a mastering monitor, tone-mapping information, etc.). The mastering monitor may be a monitor used in at least one of manufacturing or testing of the HDR content 20. The metadata may be static metadata or dynamic metadata. According to an embodiment, metadata according to a specific standard may include information such as distribution_maxrgb_percentiles, Bezier_curve_anchors, targeted_system_display_maximum_luminance, average_maxrgb, knee_point, etc.

The term 'static metadata' may refer to metadata that reflects the characteristic of an entire HDR content and is fixedly applied to a HDR content, that is, metadata fixedly applied to an HDR content regardless of scene change. The term 'dynamic data' may refer to metadata that reflects the characteristic of each scene of an HDR content, that is, metadata that is dynamically provided for each scene of an HDR content. The scene may refer to a section having a similar image quality characteristic, and it does not necessarily mean a scene in a scenario of a content such as film, which is set by a content creator, but in some cases, it may mean a scene in a scenario, which is subject to space change.

In other words, the scene in a scenario, which is set by a content creator, could be divided into different scenes depending on the brightness, color, etc. of an image although the scene is based on the same place, but the present disclosure is not limited thereto. It should be understood that dynamic metadata may be provided for each scene according to space change set by a content creator, each fame or for various content sections, etc.

An HDR content provided together with static metadata may be referred to as a static HDR content, an HDR content provided together with dynamic metadata may be referred to as a dynamic HDR content. However, for convenience of explanation, it is assumed that an HDR content is provided together with static metadata in a static HDR content, and an HDR content is provided together with dynamic metadata in a dynamic HDR content.

According to an embodiment, the display apparatus 200 may be embodied to support an HDR function. The HDR function may refer to performing image quality change (or image quality processing) and tone-mapping of the HDR content 20 based on metadata provided with an HDR content and displaying the HDR content 20. The tone mapping may refer to changing an original tone of the HDR content 20 to a dynamic range of the display apparatus 100 based on the received metadata. For example, maximum luminance of the HDR content 20 based on the metadata may be mapped to displaying capability of the display apparatus 200, that is, possible maximum luminance that could be achieved by the display apparatus 200.

Figure 2A:
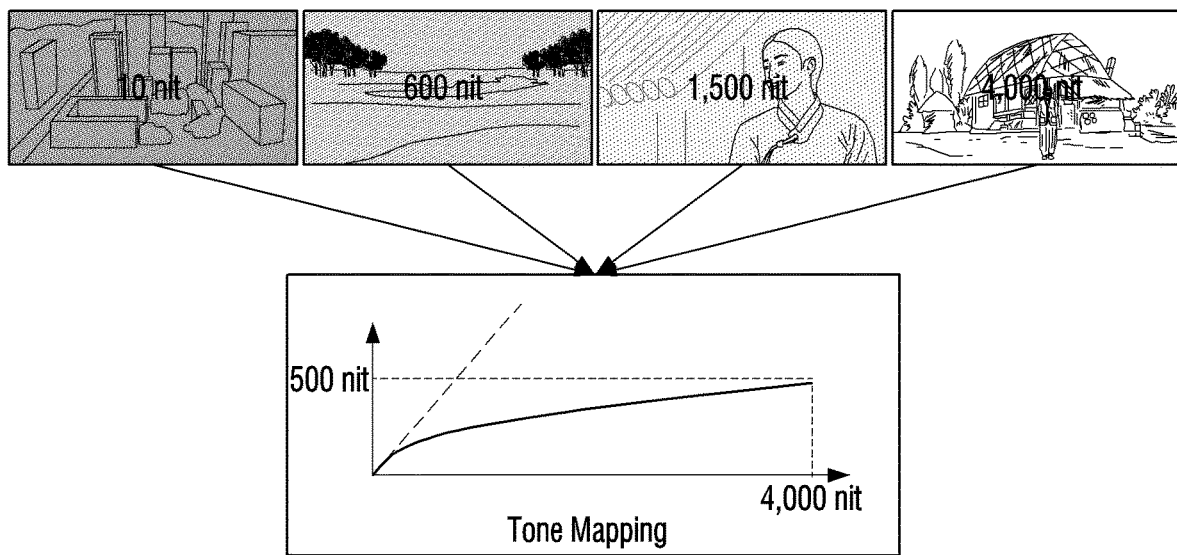
FIGS. 2A and 2B are views provided to explain a method for providing metadata according to an embodiment of the present disclosure.
Figure 2B:
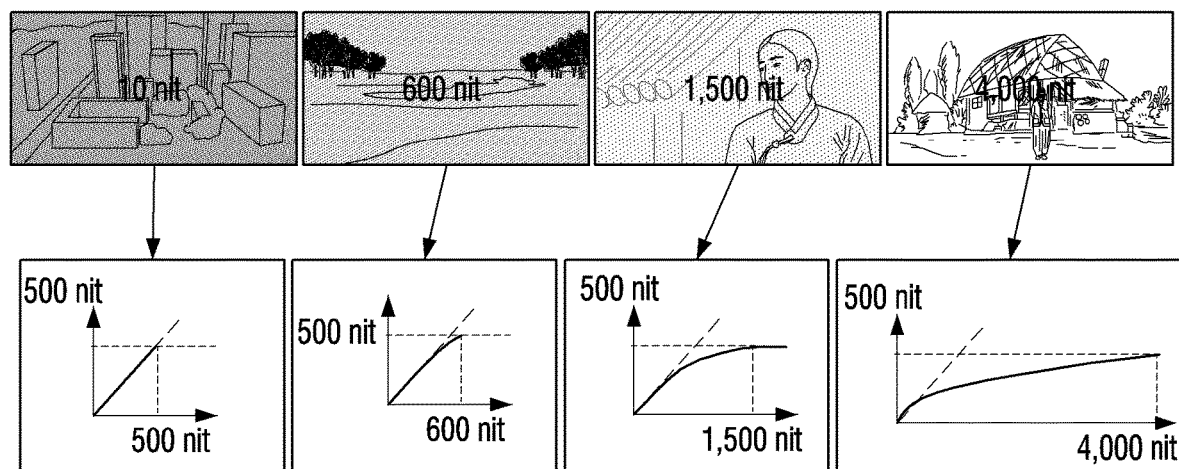

According to an embodiment, when the HDR content 20 and the static metadata corresponding to the HDR content 20 are provided, the display apparatus 100 may perform an image processing of the HDR content 20 by applying the same tone-mapping graph based on the static metadata to all frames included in the HDR content 20 as shown in FIG. 2A.

According to another embodiment, when the HDR content 20 and the dynamic metadata corresponding to each scene of the HDR content 20 are provided, as shown in FIG.

2B, the display apparatus 100 may apply a different tone mapping graph based on the dynamic metadata to each scene and perform an image processing of the HDR content 20.

When the HDR content 20 and the dynamic metadata are provided, a graphic content such as menu graphic (e.g., a top menu, a pop-up menu, an on-screen display (OSD) menu, etc.) may be provided to the electronic apparatus 100 according to a specific event while the HDR content, i.e. the HDR video content is reproduced.

When the scene is changed during the section where the menu graphic is displayed, different metadata corresponding to each scene may be identically applied to the menu graphic, so that the brightness and color of the menu graphic may be changed. The electronic apparatus 100 may perform rendering (or blending) of a frame including the video content and the menu graphic during the section where the menu graphic is provided and provide the rendered or blended frame to the display apparatus 200, and the display apparatus 200 may process the frame including the video content and the menu graphic based on the dynamic metadata corresponding to the video content.

Hereinafter, various embodiments will be exemplified for maintaining brightness and color of a graphic content when the graphic content is provided while a dynamic HDR video content is displayed.

Figure 3A:
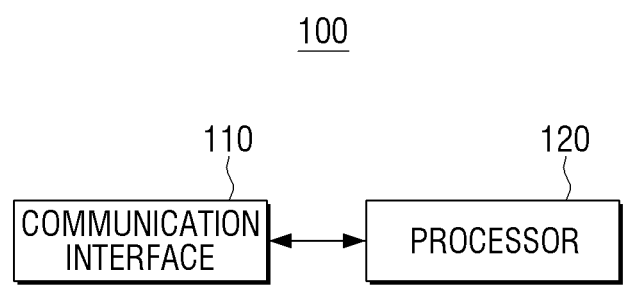
FIG. 3A is a block diagram illustrating configuration of an electronic apparatus according to an embodiment of the present disclosure.

FIG. 3A is a block diagram illustrating configuration of an electronic apparatus according to an embodiment of the present disclosure.

Referring to FIG. 3A, the electronic apparatus 100 may include a communication interface 110 (including interface circuitry) and a processor 120 (including processing circuitry). According to an embodiment of the present disclosure, the electronic apparatus 100 may be embodied as a player device that reproduces a content and provides the content to an external display apparatus 200 (including a display panel such as an OLED or LCD display panel) as shown in FIG. 1. For example, the electronic apparatus 100 may be embodied as a UHD (Ultra HD) Blu-ray player.

The communication interface 110 may perform communication with the external display apparatus 200 as shown in FIG. 1.

According to an embodiment, the communication interface 110 may be embodied as an HDMI interface that transmits high-definition video and multichannel digital audio through a single cable. For example, the communication interface 110 may include a Transition Minimized Differential Signaling (TMDS) channel for transmitting video signals and audio signals, a Display Data Channel (DDC) for transmitting and receiving device information and information relating to video and audio (e.g., Enhanced Extended Display Identification Data (E-EDID)), and Consumer Electronic Control (CEC) for transmitting and receiving control signals. However, the present disclosure is not limited thereto, and the communication interface 110 may be embodied as various interfaces according to an example embodiment. For example, the communication interface 110 may be embodied as various types of digital interfaces in support of at least one communication method of AP based Wi-Fi (Wi-Fi, Wireless LAN network), Bluetooth, Zigbee, wired/wireless LAN (Local Area Network), WAN, Ethernet, IEEE 1394, HDMI, USB, MHL, AES/EBU, optical, coaxial, or the like.

The electronic apparatus 100 may further include an additional communication interface (not shown) including interface circuitry that receives image signals in a streaming method or a download method from an external apparatus (e.g., a source apparatus), an external storage medium (e.g., a USB), an external server (e.g. a web hard), etc. through various communication methods.

According to an embodiment, the communication interface 110 may receive information relating to a monitor function of the display apparatus 200, provide the information to the processor 120, and output the content provided by the processor 120 to the display apparatus 200.

The processor 120 may control overall operations of the electronic apparatus 100.

According to an embodiment, the processor 120 may be embodied as a digital signal processor (DSP) for processing a digital image signal, a microprocessor, or a Time Controller (TCON). However, the present disclosure is not limited thereto, but the processor 120 may be embodied as one or more of a central processing unit (CPU), a microcontroller unit (MCU), a micro processing unit (MPU), a controller, an application processor (AP), a communication processor (CP) and an ARM processor, or defined by one of them. The processor 120 may be embodied as a System on Chip (SoC) including processing algorithm, or large scale integration (LSI), or may be embodied in the form of Field Programmable Gate Array (FPGA).

The processor 120 may reproduce the input content and provide the display apparatus 200 with the reproduced content together with information on the content. For example, the input content may be an HDR content encoded based on specific video codec. The video codec may be HEVC(H.265), AVC(H.264), MPEG 4, MPEG 2, etc., but the present disclosure is not limited thereto.

For example, the processor 120 may perform decoding of the input HDR content and provide the display apparatus 200 with the decoded content together with the corresponding metadata. The processor 120 may provide the display apparatus 200 with dynamic metadata corresponding to each content section together with the HDR content (hereinafter, referred to as a dynamic tone-mapping mode).

According to an embodiment, the processor 120 may decode the HDR content recorded in the disc, map different metadata corresponding to the characteristic of each section to each content section of the HDR content and provide the result to the display apparatus 200. The content section may be, for example, a scene having similar image quality, but the present disclosure is not limited thereto. The section could be a frame. The metadata corresponding to each content section may be metadata that reflects video (or image) characteristic of a content section, for example, a scene. For example, the metadata may include at least one of color space information of a content, information on the number of bits of a content, peak luminance information of a content, tone mapping information of a content and mastering monitor information (e.g., maximum brightness information).

Although the processor 120 provides different metadata corresponding to each scene, transmission of metadata may be performed for each frame. When a plurality of frames forming the same scene are provided to the display apparatus 200, the same metadata corresponding to the scene may be provided. For example, according to the HDMI standard, images and voices may be transmitted by using a Transition Minimized Differential Signaling (TMDS) channel, and control signals may be transmitted by using a Consumer Electronics Control (CEC) channel. In this case, metadata may be provided to the display apparatus 200 through a Data Island Period that transmits voice information and additional data information of TMDS, that is, a blanking period where a horizontal or a vertical synchronization signal exists. The processor 120 may store (or insert) metadata to pixel data of a predetermined area of each frame (e.g., at least one pixel line of at least one of a top area, a bottom area, a right side area, a left area, etc.) and provide the metadata to the display apparatus 200. For example, when the HDR content is input in the HEVC stream format, the processor 120 may obtain dynamic metadata, that is, HDR content information and tone mapping information from a Supplemental Enhancement Information (SEI) user data area of HEVC stream through an HEVC decoder, map the dynamic metadata corresponding to each scene to the corresponding frame, and transmit the result to the display apparatus 200. However, the present disclosure is not limited thereto, but metadata may be transmitted through an additional signal line.

The processor 120 may, based on (or in response to) a graphic content being activated, provide static metadata to the display apparatus 200 during the section where the graphic content is activated. The static metadata may refer to tone mapping control data that maintains a fixed value, which is not changed according to a content section. That is, since the processor 120 provides constant tone mapping regardless of the scene change during the section where the graphic content is provided, the metadata may be referred to as constant-tone mapping metadata (hereinafter, referred to as constant metadata) to distinguish the metadata from the existing static metadata, and a mode for providing the corresponding data may be referred to as a constant tone-mapping mode.

The processor 120 may provide data to the display apparatus 100 by converting dynamic metadata corresponding to the content section where the graphic content is activated into constant metadata gradually (or smoothly) during a plurality of frames. The processor 120 may set dynamic metadata to an initial value and constant metadata to a target value and obtain intermediate values so that an initial value is gradually converted into a target value, and map the intermediate values to respective frames included in a transition duration and transmit the result to the display apparatus 200. The dynamic metadata corresponding to the content section where the graphic content is activated may be most recent dynamic metadata with reference to a point of time when the graphic content is activated.

For example, the static metadata corresponding to the section where the graphic content is provided, that is, the constant metadata may be metadata converted from the dynamic metadata corresponding to the content section based on the static metadata of at least one of the video content or the graphic content.

According to an embodiment, the processor 120 may obtain constant data by replacing at least a part of brightness information of a content, tone-mapping information, maximum brightness information of a mastering monitor, RGB information of content (e.g., distribution_maxrgb_percentiles, Bezier_curve_anchors, targeted_system_display_maximum_luminance, average_maxrgb and knee_point) included in the dynamic metadata corresponding to each content section during the section where the graphic content is activated with at least a part of maximum brightness information of a content and maximum brightness information of a mastering monitor included in the static metadata.

According to another embodiment, the processor 120 may obtain a calculation value obtained by calculating at least a part of the maximum brightness information of the content and maximum brightness information of a mastering monitor included in the static metadata corresponding to the HDR content according to a predetermined formula, and replacing at least a part of the brightness information of the content, tone-mapping information, maximum brightness information of the mastering monitor, RGB information of the content included in the dynamic metadata corresponding to each content section during the section where the graphic content is activated with the obtained calculation value.

For the shake of smooth transition, with respect to the frames included in a plurality of frame, the processor 120 may obtain metadata corresponding to a frame by applying a predetermined weight value to the metadata corresponding to the previous frame. The metadata corresponding to the first frame among a plurality of frames may be dynamic metadata corresponding to a content section where the graphic content is activated, that is, the most recent metadata with reference to a point of time when the graphic content is activated. The metadata corresponding to the last frame among the plurality of frames may be data converted based on the constant metadata.

For example, if the graphic content is activated in an nth frame, and smooth transition is performed until an (n+t)th frame. That is, it is assumed that an (n−1)th frame is the first frame among in the plurality of frame, and an (n+t)th frame is the last frame among the plurality of frames.

In this case, the processor 120 may transmit dynamic metadata corresponding to the (n−1)th frame, and from the nth frame, apply a predetermined weight value to metadata corresponding to the previous frame and obtain the corresponding metadata. That is, the processor 120 may obtain metadata corresponding to the nth frame, metadata(n), by applying a predetermined weight value to the dynamic metadata corresponding to the (n−1)th frame, and obtain the metadata corresponding to the (n+1)th frame, metadata (n−1), by applying a predetermined weight value the metadata corresponding to the nth frame, that is, the metadata (n). As described above, the processor 120 may obtain metadata corresponding to an (n+k)th frame, that is, metadata(n+k), by applying a predetermined weight value to the metadata corresponding to the (n+k−1)th frame, metadata(n+k−1). The metadata corresponding to (n+t)th frame may be the constant metadata described above.

For another example, with respect to the frames included in a plurality of frames, the processor 120 may obtain corresponding metadata by calculating a sum of a value obtained by applying a predetermined first weight value to the metadata corresponding to a previous frame and a value obtained by applying a second weight value to predetermined reference data.

For example, the processor 120 may transmit dynamic metadata corresponding to the (n−1)th frame, and from the nth frame, obtain corresponding metadata by applying a predetermined weight value to the metadata corresponding to the previous frame. That is, the processor 120 may obtain the metadata corresponding to the nth frame, metadata(n), by calculating a sum of a value obtained by applying a predetermined first weight value to the dynamic metadata corresponding to the (n−1)th frame and a value obtained by applying a second weight value to predetermined preference data (REF), and as for the (n+1)th frame, the processor 120 may obtain the metadata corresponding to the (n−1)th frame, the metadata(n−1), by calculating a sum of a value obtained by applying a first weight value to the metadata corresponding to the nth frame, the metadata(n), and a value obtained by applying a second weight value to the predetermined reference data (REF). As for the (n+k)th frame, the processor 120 may obtain metadata corresponding to the (n+k)th frame, metadata(n+k), by calculating a sum of a value obtained by applying a first predetermined weight value to the metadata corresponding to the (n+k−1)th frame, metadata(n+k−1), and a value obtained by applying a second weight value to the predetermined reference data (REF). The metadata corresponding to the (n+t)th frame may be the constant metadata.

For example, a calculating method for metadata may be expressed in equation 1 as below.

$$TM[n-1]=DM[n-1]$$

$$TM[n]=STM[n]=\alpha*REF+(1-\alpha)*DM[n](0\leq\alpha\leq1)$$

$$TM[n+k]=STM[n+k]=\alpha*REF+(1-\alpha)*STM[n+k-1],$$
$$k=1,2\ldots t$$

$$TM[n+t]=CDM \quad\quad\quad [\text{Equation 1}]$$

Where TM[n] is Tone-Mapping Metadata at nth frame, DM[n] is Dynamic Metadata at nth frame, STM[n] is Smooth Transition Metadata at nth frame, CDM is Constant-Tone Mapping Metadata, α is a mixing ratio, k is an index representing the frame number for the transition and t is the total number of frames for the transition interval.

Conversely, when the activated graphic content becomes inactivated, the processor 120 may perform smooth metadata transition in the same method with respect to each of the plurality of frames. For example, oppositely, a method for calculating metadata may be expressed in equation 2 as below.

$$TM[n-1]=CDM$$

$$TM[n]=STM[n]=\alpha*REF+(1-\alpha)*CDM(0\leq\alpha\leq1)$$

$$TM[n+k]=STM[n+k]=\alpha*REF+(1-\alpha)*STM[n+k-1],$$
$$k=1,2\ldots t$$

$$TM[n+t]=DM[n+t] \quad\quad\quad [\text{Equation 2}]$$

In some cases, the processor 120 may provide the display apparatus 200 with a graphic content where a pixel value is converted (or modified) based on the dynamic metadata corresponding to the video content during the section where the graphic content is activated.

The graphic content according to an embodiment of the present disclosure may include at least one of Interactive Graphic (IG), Presentation Graphic (PG) and Graphical User Interface (GUI). The IG may refer to a graphic content selected or controlled by a user such as main menu graphic, etc. provided at a specific point of time (e.g., a content initial point of time), and the PG may refer to a graphic content that shows a one-way content to a user such as subtitles, show guest information, etc. The GUI may refer to a UI provided according to a user command such as a replay control menu, etc. The subtitles may not be processed as the graphic content according to an embodiment of the present disclosure if the subtitles are provided throughout the entire content.

The graphic content may be activated when an event occurs where a user command is input through the electronic apparatus 100 or the display apparatus 200, or when it approaches a specific section (or a specific frame) or a specific point of time that automatically provides a graphic content in the HDR content. An Application Programming Interface (API) or a program corresponding to each content section may include information regarding whether the graphic content is activated, and whether the graphic content is activated may be identified based on the information. For example, IG, PG, etc. may be provided through the Java application in the case of Java blue-ray disc (BD-J), and the electronic apparatus 100 may not identify a graphic activation point of time. The content may include information on whether the graphic content is activated or the graphic content activation point of time, which are to be provided to the electronic apparatus 100.

For example, the processor 120 may call Application Programming Interface (API), and identify whether the graphic content is activated based on mode information included in the API. For example, the processor 120 may select the corresponding metadata based on mode parameter included in the API and transmit the metadata to the electronic apparatus 200. For example, a value "0" of the mode parameter (or mode flag) may refer to a dynamic metadata mode, and a value "1" may refer to a static metadata mode (i.e. a mode where graphic is activated). A value "−1" may mean that the API does not change a tone-mapping mode. When the value of the mode parameter is "1", the processor 120 may transmit the dynamic metadata converted based on the static metadata to the electronic apparatus 200 instead of the dynamic metadata corresponding to the content section. When the value of the mode parameter is "0", the processor 120 may transmit the dynamic metadata converted based on the static metadata to the electronic apparatus 200 instead of the dynamic metadata corresponding to a content section. In addition, when the value of the mode parameter is "0", the processor 120 may transmit the dynamic metadata to the electronic apparatus 200.

For another example, when the information on whether the graphic content is activated is included by using bits on a reserved area of metadata, the processor 120 may identify a point of time when the graphic content is activated based on the bits.

The GUI may be menu graphic provided by the electronic apparatus 100 according to a user command, and therefore it may be different from IG, PD, etc. in that the electronic apparatus 100 identifies a point of time when the graphic content is provided. For example, when the graphic content is activated, the processor 120 may perform rendering (or blending) of a frame where the graphic content is included in the video content and provide the frame to the display apparatus 200. The metadata corresponding to each of a plurality of frames included in the section where the graphic content is activated may be provided. The converted metadata may be provided to the frame included in the metadata transition duration among the sections where the graphic content is activated, and the constant metadata may be provided to the frame after the metadata transition duration.

Meanwhile, the constant metadata according to another embodiment of the present disclosure may be, for example, graphic content-only metadata provided by a content creator, static metadata corresponding to a graphic content, metadata converted from the dynamic metadata corresponding to at least one section where the graphic content is provided based on the characteristic of the graphic content, static metadata corresponding to at least one of the video content and the graphic content, etc. The reason for transmitting constant metadata rather than dynamic metadata based on the scene during the section where the graphic content is activated is as follows.

As described above, when the display apparatus 200 processes the graphic content based on dynamic metadata which is different for each scene, and the graphic content is provided throughout a plurality of scene sections, brightness, color, etc. of the graphic content may be changed by scene although the graphic content is same. Therefore, the present disclosure is purposed to maintain brightness and color of the graphic content provided while the dynamic HDR content is displayed although the scene is changed. In addition, the present disclosure aims to maintain brightness and color of the graphic content as intended by a content creator. For example, when the graphic content is activated while a plurality of scenes are provided, if an image processing is performed based on the metadata of the first scene where the graphic content is provided during the plurality of scenes, a user may be provided with the graphic content of a predetermined brightness and color. Due to such image processing, the video content provided for the plurality of scenes may not be processed based on the metadata corresponding to the characteristic of the scene, but the content of a user of interest may be a graphic content, not a video content while the graphic content is provided.

According to another embodiment of the present disclosure, a graphic content may be processed by combining at least two embodiments. For example, the processor 120 may convert and provide the dynamic metadata corresponding to a video content based on the characteristic of a graphic content while the graphic content is activated, and change a pixel value of the graphic content and provide the pixel value to the display apparatus 200.

Figure 3B:
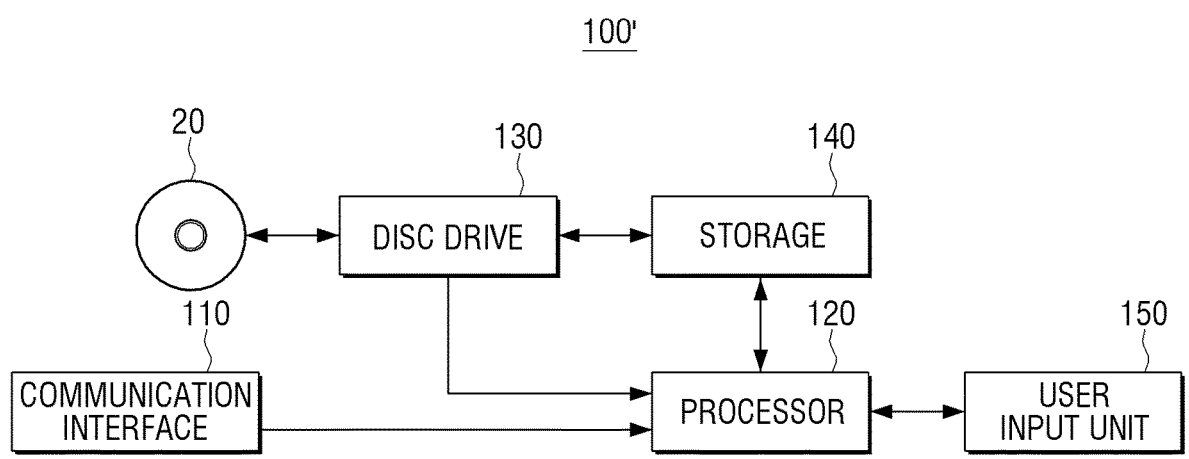
FIG. 3B is a view illustrating an example embodiment of the electronic apparatus shown in FIG. 3A.

FIG. 3B is a view illustrating an implementation example of the electronic apparatus shown in FIG. 3A.

Referring to FIG. 3B, an electronic apparatus 100' according to an embodiment of the present disclosure may include a communication interface 110, a processor 120, a disk drive 130, a storage 140 and a user input unit 150. The repetition of explanation of FIG. 2A will be omitted.

The processor 120 may include a CPU, a ROM, a RAM, a graphic engine, a decoder, a scaler, and the like. In addition, the processor 120 may include Audio DSP for processing an audio signal.

The disk drive 130 may read data from an optical disc 20 and output the read data to at least one of the processor 120, the communication interface 110 and the storage 140. For example, the disk drive 130 may be implemented as a BD-ROM drive, a BD combo drive, or the like.

The storage 140 may store data necessary for the processor 120 to execute various processes. For example, the storage 140 may be embodied as an internal memory such as ROM or RAM, or the like included in the processor 120, or embodied as a separated memory from the processor 140. In this case, the storage 140 may be embodied in the form of a memory embedded in the electronic apparatus 100, or a removable memory from the electronic apparatus 100, depending on the purpose of data storage. For example, in the case of data for driving the electronic apparatus 100, the data may be stored in a memory embedded in the electronic apparatus 100, and in the case of data for expanding the capability of the electronic apparatus 100, the data may be stored in a removable memory. The memory embedded in the electronic apparatus 100 may be embodied in the form of a nonvolatile memory, a volatile memory, a flash memory, a hard disk drive (HDD), or a solid state drive (SSD), and the removable memory from the electronic apparatus 100 may be embodied in the form of a memory card (e.g., a micro SD card, a USB memory, etc.), an external memory connectable to a USB port (e.g., a USB memory), and the like.

The user input unit 150 may include at least one of a button, a key, a touch panel, a remote signal receiving unit that receives a remote signal from a remote controller.

The processor 120 may perform decoding of a video content supplied from the disk driver 130, and provide an HDR content, an SDR content, a UHD content, etc. to the communication interface 110. The processor 120 may perform decoding of the HDR content and provide dynamic metadata in accordance with sync for each frame to the display apparatus 200. The processor 120 may perform various functions based on the characteristic of the input content. For example, the processor 120 may convert the input HDR content into an SDR content and provide the SDR content when the display apparatus 100 is identified as an SDR TV based on the information received from the connected display apparatus 100 (e.g. EDID information of the HDMI interface). The opposite may be true.

Figure 4:
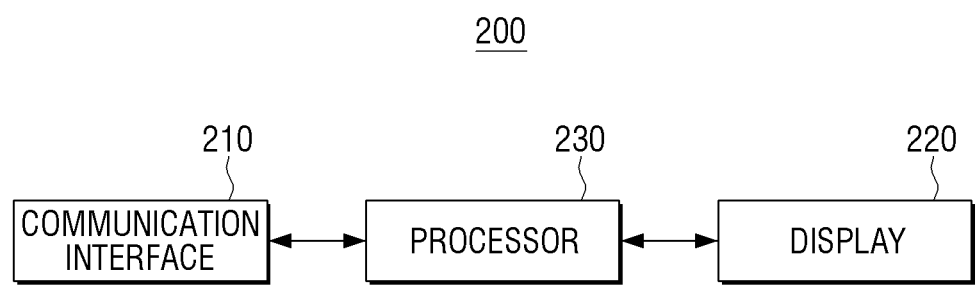
FIG. 4 is a block diagram illustrating configuration of a display apparatus according to an embodiment of the present disclosure.

FIG. 4 is a block diagram illustrating configuration of a display apparatus according to an embodiment of the present disclosure.

Referring to FIG. 4, a display apparatus 200 may include a communication interface 210 including interface circuitry, a display 120 and a processor 130 including processing circuitry.

The communication interface 210 may perform communication with an external electronic apparatus 100 as shown in FIG. 1.

The communication interface 210 may be embodied as an HDMI interface that transmits high resolution video and multi-channel digital video through one cable. For example, the communication interface 210 may include a Transition Minimized Differential Signaling (TMDS) channel for transmitting video signals and audio signals, Display Data Channel (DDC) for transmitting and receiving device information and information relating to video or audio (e.g., Enhanced Extended Display Identification Data (E-EDID)), and Consumer Electronic Control (CEC) for transmitting and receiving control signals. However, the present disclosure is not limited thereto, but the electronic apparatus 100 may be embodied as various interfaces according to an embodiment. For example, the communication interface 210 may be embodied with various types of digital interfaces in accordance with at least one communication method of AP based Wi-Fi (Wi-Fi, Wireless LAN network), Bluetooth, Zigbee, wired/wireless LAN (Local Area Network), WAN, Ethernet, IEEE 1394, HDMI, USB, MHL, AES/EBU, Optical and Coaxial.

According to an embodiment, the communication interface 210 may provide information on a monitor function of the display apparatus 200 to the electronic apparatus 100 and receive the content provided from the electronic apparatus 100.

The display 220 may be embodied in various types of displays such as a liquid crystal display (LCD), an organic light-emitting diode (OLED), a light-emitting diode (LED), a liquid crystal on silicon (LCoS), a digital light processing (DLP), quantum dot (QD), display panel, and the like.

The processor 230 may control overall operations of the display apparatus 200. The implementation of the processor 230 may be the same as/similar to the implementation of the processor 120 of the electronic apparatus 100, so a detailed description will be omitted.

According to an example embodiment, based on (and/or in response to) a video content and dynamic metadata corresponding to a predetermined content section being received from the electronic apparatus 100 through the communication interface 210, the processor 230 may process a video content based on dynamic metadata. In addition, the processor 230 may control a display 220 to display the processed video content.

In response to a graphic content being activated, the processor 230 may process a video content and a graphic content based on metadata corresponding to the graphic content, that is, constant metadata during at least one section where the graphic content is activated. The metadata corresponding to the graphic content may be metadata corresponding to a specific video content section where the graphic content is activated, metadata for graphic content only provided by a content creator (e.g. static metadata corresponding to a graphic content), metadata corresponding to a video content and a graphic content provided by a content creator (e.g., static metadata corresponding to a video content and a graphic content), metadata converted from the dynamic metadata corresponding to at least one section where the graphic content is provided based on the characteristic of the graphic content by the electronic apparatus 200, metadata converted from the dynamic metadata corresponding at least one section where the graphic content is provided based on the static metadata of at least one of the video content and the graphic content, etc. Examples of constant metadata may be the same as metadata transmitted from the electronic apparatus 100, and therefore, the detailed description will be omitted.

For example, when the electronic apparatus 100 identifies and transmits constant metadata while a graphic content is activated, the processor 230 may not separate the video content and the graphic content based on the received metadata during the content section and process the video content and the graphic content. Accordingly, the graphic content may be provided with a predetermined brightness and color, but the video content may not processed based on the corresponding dynamic metadata, and thus while the graphic content is activated, a video content that reflects the content creator's intention may not be provided while the graphic content is activated, but a content of a user of interest may be a graphic content in a corresponding section, not a video content. As shown in FIG. 1, the reason why the processor 230 could not separately processes the graphic content is that the electronic apparatus 100 may perform rendering (or blending) of a frame including the graphic content and the video content and provide the frame to the display apparatus 200.

When the constant metadata is provided from the electronic apparatus 100 during the content section where the graphic content is provided, the display apparatus 200 may manually process the content based on the provided metadata. The display apparatus 100 may not identify whether the graphic content is activated, and but may process the content based on the metadata transmitted after the electronic apparatus 100 identifies whether the graphic content is activated.

According to another embodiment, the display apparatus 200 may process a content by directly identifying whether the graphic content is activated. For example, the electronic apparatus 100 may provide dynamic metadata of a video content, static metadata of at least one of a video content and a graphic content and information indicating whether the graphic content is activated to the display apparatus 200. The display apparatus 200 may process a frame of dynamic metadata in the section where the graphic is activated based on the information indicating whether the graphic content is activated, and process a frame based on the static metadata in the section where the graphic content is activated. In this case, the display apparatus 100 may perform smooth transition between the dynamic metadata lastly received before the graphic content is activated and the static metadata.

For example, the display apparatus 200 may receive one bit flag value indicating whether the graphic content is activated ("1": graphic activation and "0": graphic inactivation) from the electronic apparatus 100, and identify whether the graphic content is activated based on the flag value. For example, when the first bit flag is set to "1", it may be determined that the graphic content is activated. The display apparatus 200 may perform smooth transition between the dynamic metadata lastly received before the first bit flag value is changed from "0" to "1" and predetermined static metadata.

According to another embodiment, the display apparatus 200 may actively analyze the characteristic of a video content including the graphic content and perform an image process of a video frame including the graphic content.

Specifically, the display apparatus 200 may directly identify metadata applied during the section where the graphic content is activated, or identify whether the graphic content is activated when performing an image processing according to the characteristic of the graphic content. In this case, since the display apparatus 200 is provided with a content where the video content and the graphic content are rendered (or blended) from the electronic apparatus 100, the display apparatus 200 may not identify and process only the graphic content, but may perform an image processing of the input content in the same manner. For example, if the electronic apparatus 100 provides dynamic metadata corresponding to the video content while the graphic content is activated, the display apparatus 200 may process the input video content and graphic content by using pre-stored additional metadata, not the dynamic metadata input during the section where the graphic content is activated.

The processor 230 may identify a point of time when the graphic content is activated based on the information provided by the electronic apparatus 100. For example, specific bit in a specific area of metadata provided by the electronic apparatus 100 may indicate the corresponding information. For example, the processor 230 may include information on whether the graphic content is activated by assigning one bit to a reserved area of the dynamic metadata provided by the electronic apparatus 100. The information on whether the graphic content is activated may be added to the dynamic metadata by a content creator (e.g., IG, PG, etc.), or added to the dynamic metadata (e.g., a GUI provided according to the user command) by the electronic apparatus 100.

When the graphic content is activated, the processor 230 may process a content based on the metadata obtained by converting the dynamic metadata corresponding to the content section where the graphic content is activated into constant metadata gradually (or smoothly) during a plurality of frames.

The processor 230 may receive metadata gradually (or smoothly) converted during a plurality of frames from the electronic apparatus 100, but the processor 230 may obtain the metadata which is gradually converted during a plurality of frames based on the dynamic metadata corresponding to the video content and the constant metadata corresponding to the graphic content.

The processor 230 may obtain metadata corresponding to the frames included in a plurality of frames where the metadata is converted by applying a predetermined weight value to the metadata corresponding to each previous frame. The metadata corresponding to a first frame among the plurality of frames, may be dynamic metadata corresponding to the content section where the graphic content is activated. The metadata corresponding to the last fame among the plurality of frames may be metadata obtained by converting the dynamic metadata corresponding to the first frame based on the static metadata of at least one of a video content and a graphic content, that is, constant data. The constant metadata may be provided from the electronic apparatus 100. The processor 230 may convert the dynamic metadata corresponding to the frame based on the static metadata of at least one of the video content and the graphic content and obtain the constant metadata corresponding to the last frame.

A specific method for obtaining metadata corresponding to the frames included in a plurality of frames may be the same as the method for obtaining metadata from the electronic apparatus 100. Therefore, the detailed description will be omitted.

FIG. 5A is a view provided to explain an implementation example of dynamic metadata according to an embodiment of the present disclosure.

According to an embodiment of the present disclosure, the dynamic metadata may be embodied as HDR metadata in accordance with the HDMI protocol. For example, the dynamic metadata may be transmitted from Vendor Specific Infoframe (VSIF) packet as shown in FIG. 5.

FIG. 5B is a view provided to explain an example embodiment of constant metadata according to an embodiment of the present disclosure.

According to an embodiment, the dynamic metadata as shown in FIG. 5B may be converted according to a predetermined conversion formula, and the converted metadata may be used while the graphic content is provided.

For example, in FIG. 5A, targeted_system_display_maximum_luminance may be converted into O, maxscl [w] [i] may be converted into maxDML, average_maxrgb [w] may be converted into 0.5*maxDML, and the distribution values may be converted based on the table shown in FIG. 5B. In addition, the distribution values may be converted into tone_mapping_flag [w] 0. That is, the Basis Tone Mapping Curve (Bezier curve) information may not be used in a constant tone mapping mode in which the graphic content is provided.

Figure 6:
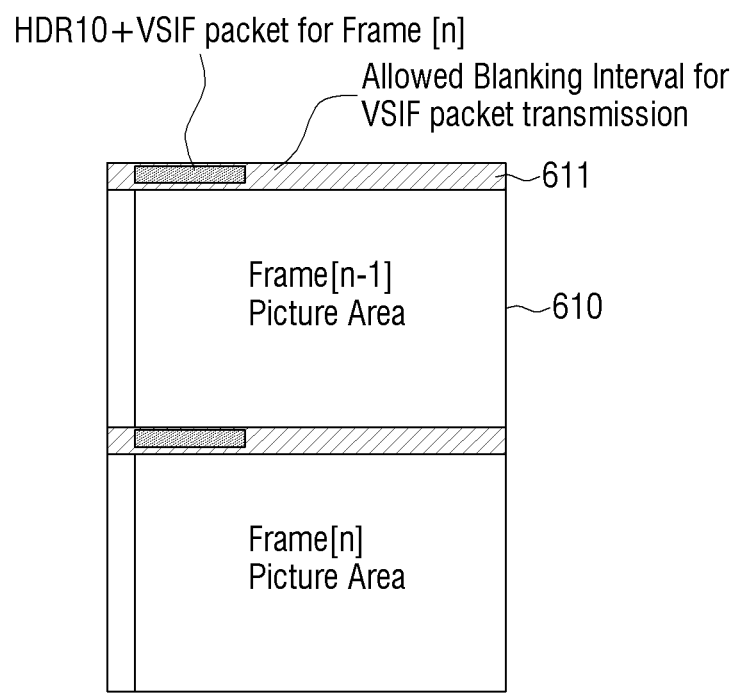
FIG. 6 is a view provided to explain a transmitting method for metadata according to an embodiment of the present disclosure.

FIG. 6 is a view provided to explain a transmitting method for metadata according to an embodiment of the present disclosure.

According to an embodiment of the present disclosure, as shown in FIG. 5A, a VSIF packet may be transmitted in a manner as shown in FIG. 6. For example, a VSIF packet corresponding to Frame [n] may be transmitted at a top horizontal blanking interval 611 of Frame [n−1] 610. However, the exact location of the VSIF packet in the blanking interval may be changed according to the example embodiment.

Figure 7A:
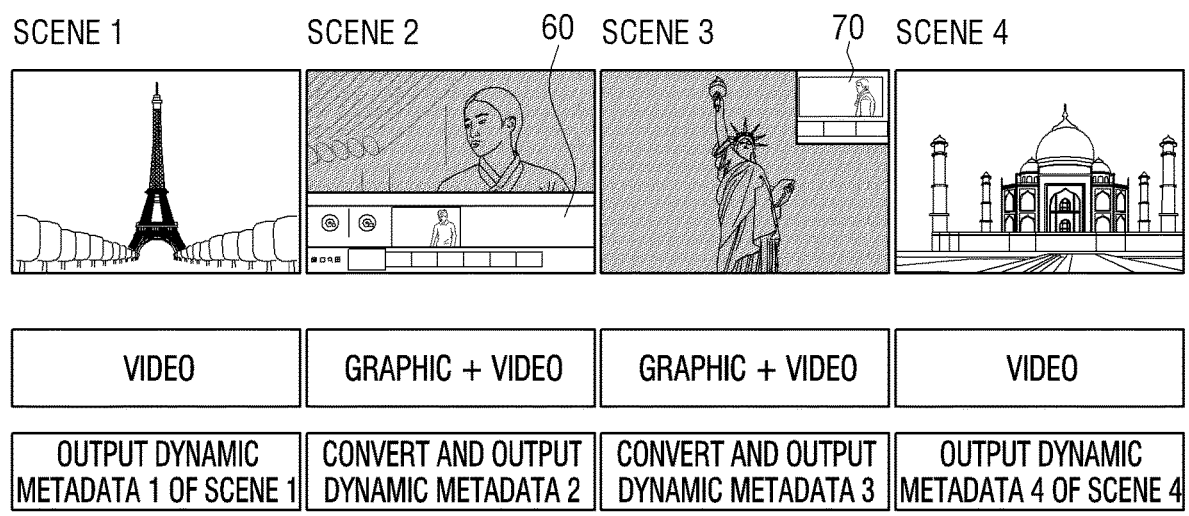
FIGS. 7A, 7B, and 7C are views provided to explain a tone mapping mode transition method according to an embodiment of the present disclosure.
Figure 7B:
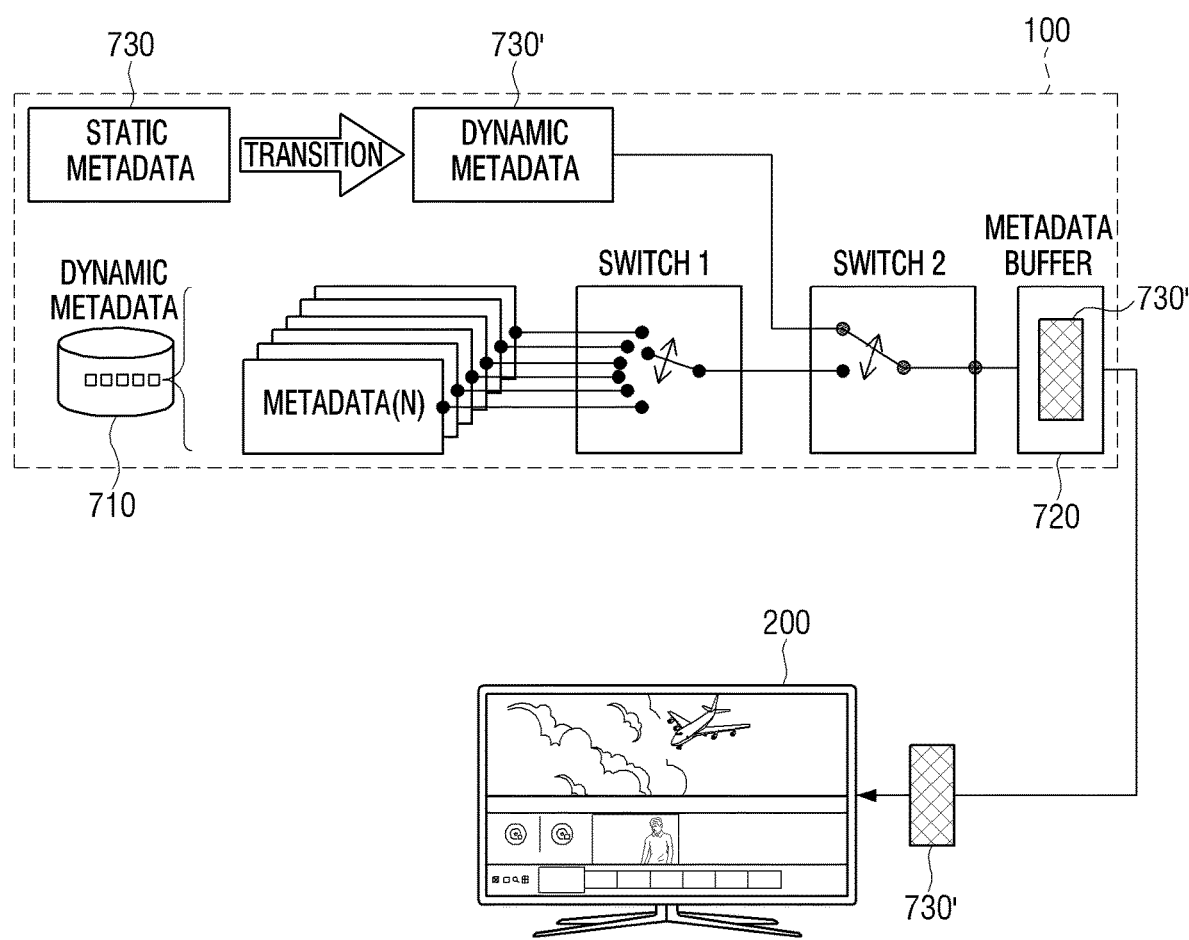

FIGS. 7A and 7B are views provided to explain a tone mapping mode transition method according to an embodiment of the present disclosure.

In FIG. 7A, it is assumed that scenes 1, 2, 3 and 4 of a video content are sequentially reproduced and different graphic contents are provided in the scenes 2 and 3.

According to an embodiment of the present disclosure, as shown in FIG. 7A, when the first and second graphic contents 60 and 70 are provided in scenes 2 and 3, the electronic apparatus 100 may provide constant metadata converted from the dynamic metadata of the video content provided at scenes 2 and 3 based on the static metadata of at least one of the video content and the graphic content to the display apparatus 200.

For example, the electronic apparatus 100 may provide dynamic metadata obtained by converting (replacing) dynamic metadata 2 and dynamic metadata 3 respectively corresponding to scene 2 and scene 3 based on the static metadata of the video content and the graphic content in the sections where the graphic contents 60 and 70 are provided, that is, the scene 2 and the scene 3. The dynamic metadata converted based on the static metadata may be the constant metadata, that is, the metadata obtained by converting at least a part of dynamic metadata is converted (or replaced) to at least a part of the static metadata in the format of the dynamic metadata. Converting (or replacing) dynamic metadata based on static metadata may indicate that not only replacing at least a part of dynamic metadata with at least a part of static metadata, but also indicate replacing at least a part of dynamic metadata with calculation data obtained by calculating part of the static metadata using a predetermined calculation method (or a calculation formula).

The static metadata of the video content and the graphic content may be metadata that the content creator has created by reflecting the characteristics of the video content and the graphic content in the corresponding scene section. However, the present disclosure is not limited to this, but the dynamic data obtained by converting the dynamic metadata 2 and the dynamic metadata 3 based on static metadata of a video content or static metadata of a graphic content in scenes 2 and 3 may be provided.

In this case, the display apparatus 200 may process frames based on the dynamic metadata converted based on the static metadata while the scenes 2 and 3 are displayed, and therefore the brightness and color of the graphic contents 60 and 70 may be maintained as intended by a content creator.

FIG. 7B is a detailed view provided to explain the operation of the electronic apparatus 100 according to an embodiment.

Referring to FIG. 7B, the electronic apparatus 100 may select dynamic metadata corresponding to each content section from a dynamic metadata set in a content section where a graphic content is not provided, and provide the dynamic metadata to a metadata buffer 720 (operation switch 1).

However, the electronic apparatus 100 may select dynamic metadata 730' converted from the dynamic metadata 730 based on static metadata and provide the dynamic metadata 730' to a metadata buffer 720 (operation switch 2).

Figure 7C:
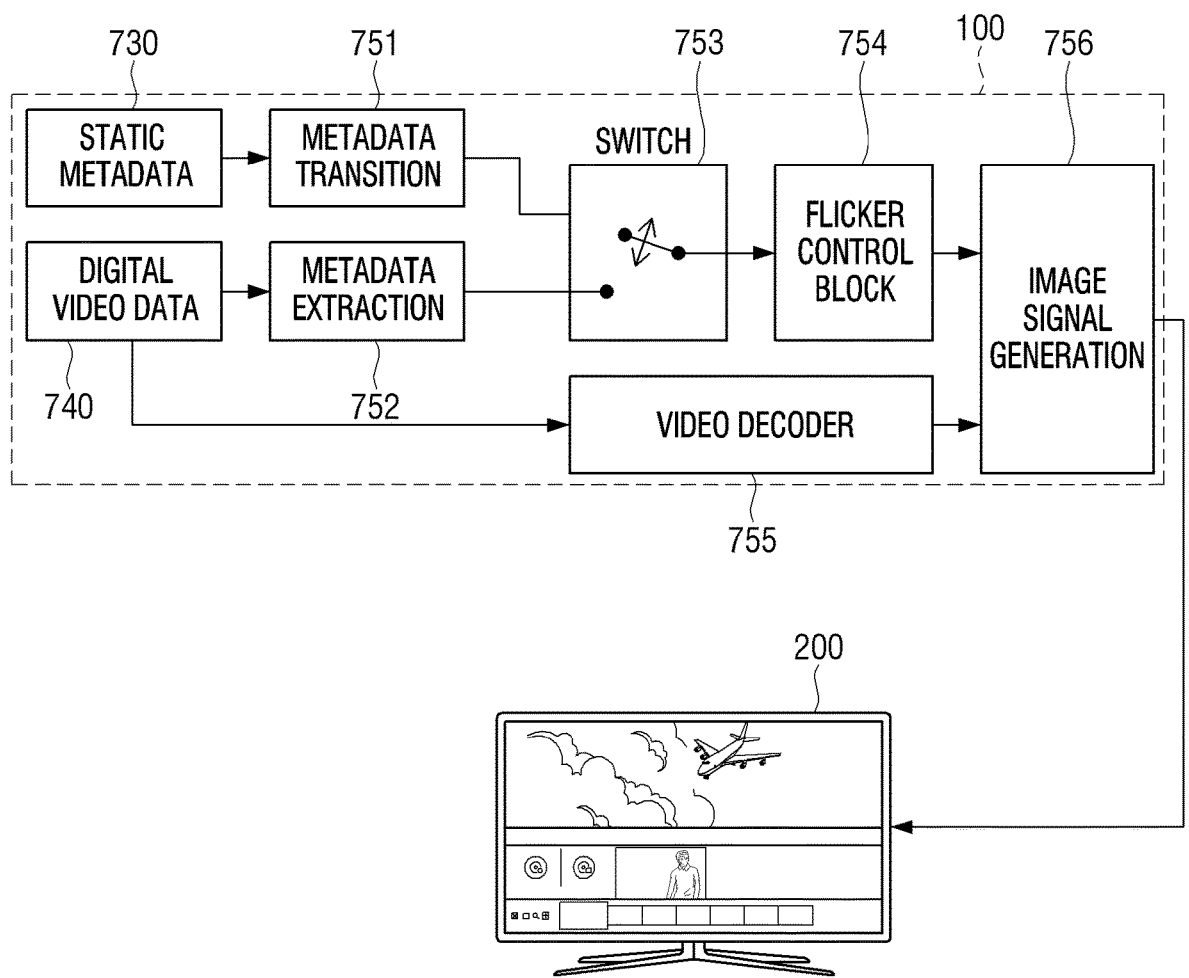

FIG. 7C is a view provided to explain the operation of the electronic apparatus according to another embodiment.

Referring to FIG. 7C, the electronic apparatus 100 may select metadata 751 obtained by converting the format of the static metadata 730 according to various embodiments based on whether the graphic content is provided or metadata 752 extracted from digital video data 740. The electronic apparatus 100 may perform a flicker control operation 754 with respect to the selected metadata (e.g., smooth transition of the metadata), generate an image signal 756 based on digital video data decoded by a video decoder 755 and the metadata where the flicker control operation is performed, and provide the image signal to the display apparatus 200 (e.g., TV, tablet, monitor, or the like which may include a display panel).

Figure 8B:
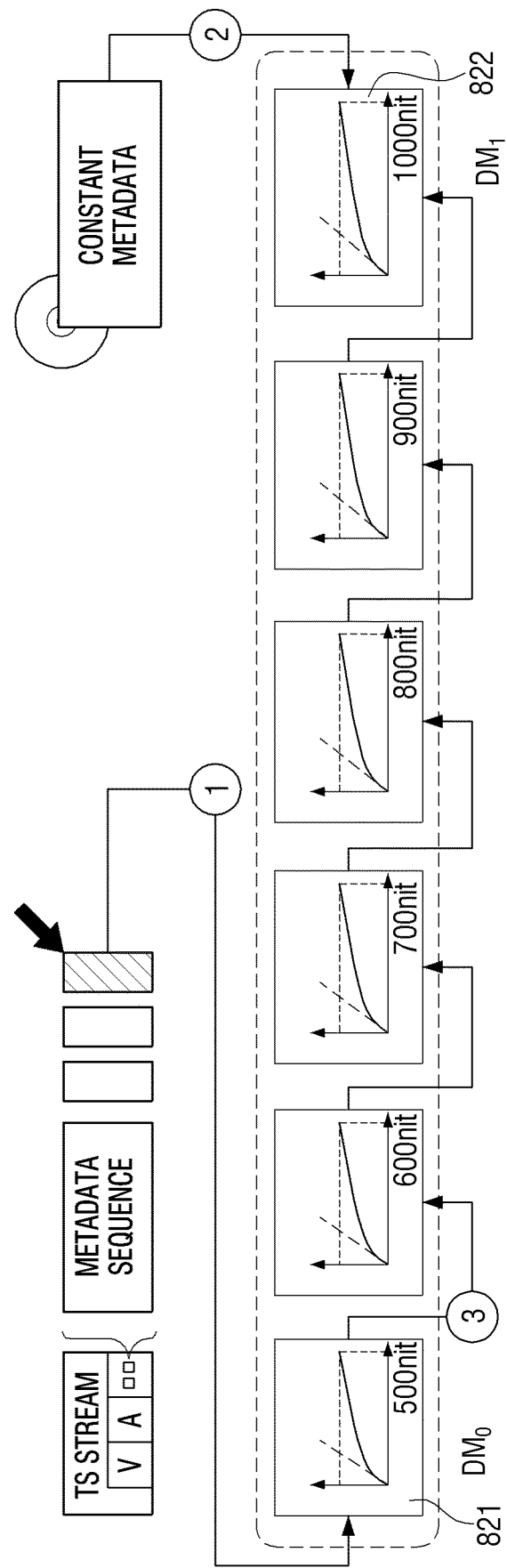

FIGS. 8A and 8B are views provided to explain a tone mapping mode transition method according to an embodiment of the present disclosure According to an embodiment, as the graphic content is activated, the dynamic metadata may be converted into the constant metadata, thereby performing smooth transition.

Referring to FIG. 8A, the electronic apparatus 100 may select the dynamic metadata corresponding to each content section at a dynamic metadata set 810 in a content section where the graphic content is not provided, that is, a dynamic tone-mapping mode.

When the graphic content is activated, smooth metadata transition may be performed during a plurality of frames to change to the constant tone-mapping mode. Specifically, the dynamic metadata provided in the dynamic tone-mapping mode may be gradually (or smoothly) converted into the constant metadata corresponding to the constant tone-mapping mode. The mode transition information and information of a transition interval may be included in the API.

As shown in FIG. 8B, the electronic apparatus 100 may capture the latest dynamic metadata and store the dynamic metadata as DM0 when the API indicating that the graphic content is activated is called. The content metadata obtained based on the dynamic metadata may be stored as DM1. For example, the metadata may be changed from DM0 to DM1 during a transition duration set by the API (e.g., milliseconds).

For example, as shown in FIG. 8B, when the maximum brightness of a monitoring display is 500 nit in the DM0 and the maximum brightness of the monitoring display is 1000 nit in the DM1, the metadata where the maximum brightness gradually increases during a predetermined transition duration may be obtained and transmitted to the display apparatus 100.

Figure 9:
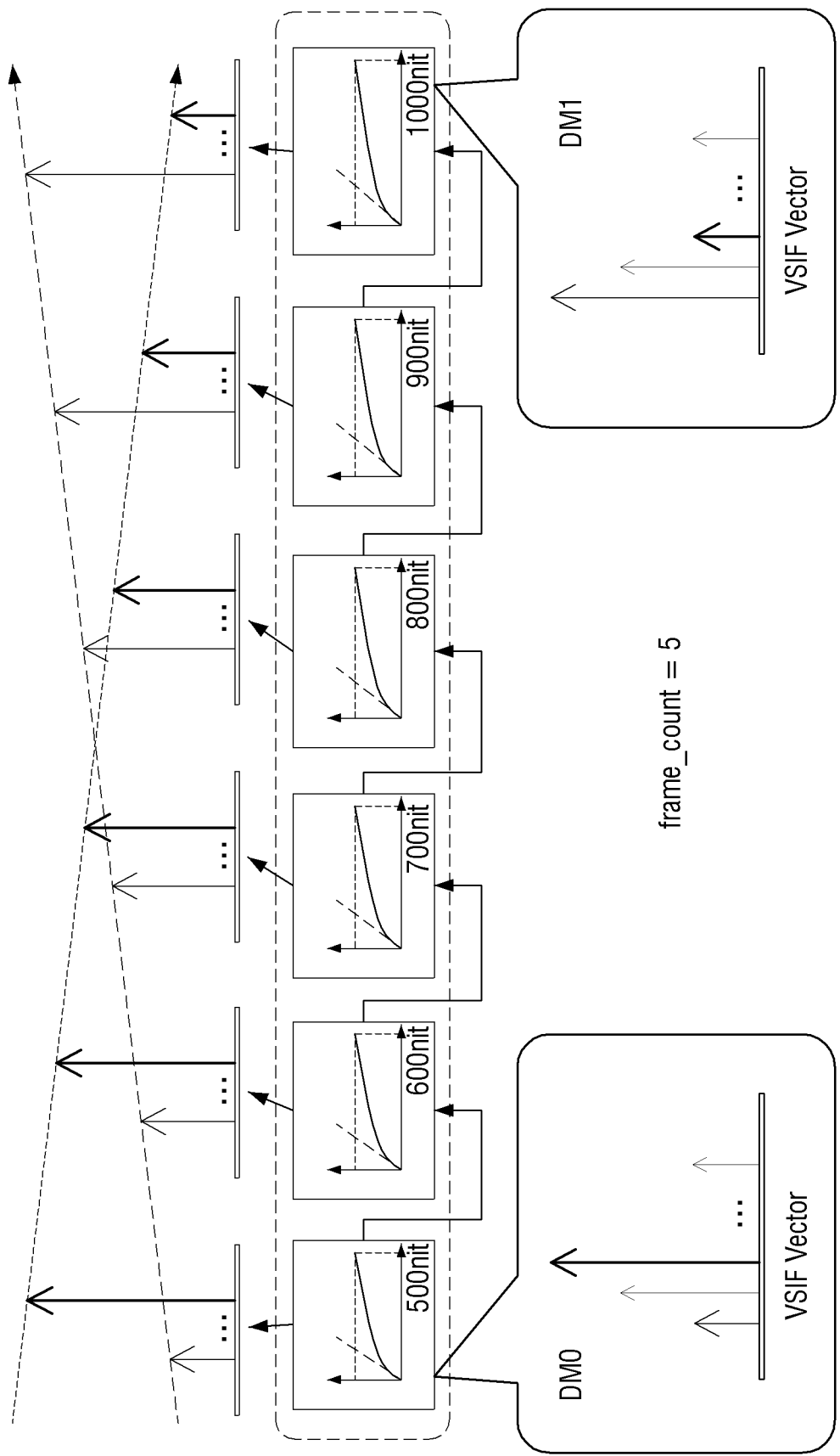
FIG. 9 is a flowchart provided to explain a method for obtaining tone mapping data according to an embodiment of the present disclosure.

FIG. 9 is a flowchart provided to explain a method for obtaining tone mapping data according to an embodiment of the present disclosure.

According to an embodiment of the present disclosure, the metadata corresponding to each of a plurality of frames included in a transition duration may be obtained by applying a parameter value which is increased and reduced in a predetermined unit to the dynamic metadata (DM0) obtained in FIG. 8B.

As shown in FIG. 9, when the dynamic metadata is gradually converted into the constant metadata during five frame sections, a parameter value applied to obtain metadata corresponding to each of the plurality of frames included in a transition duration may be gradually increased or reduced. For example, a first parameter value may be increased by a predetermined value, and a second parameter value may be reduced by a predetermined value. For example, when a parameter value is presented by a VSIF Vector, the magnitude of the vector may be gradually increased or reduced from DM0 to DM1. For example, as shown in FIG. 8B, the maximum brightness of the monitoring display from DM0 to DM1 may be increased by a preset size, i.e., 100 nit units. However, the present disclosure is not limited thereto, but a plurality of parameter values that affect metadata values during a transition duration may be increased or decreased in a different unit (or the same unit), or each of the plurality of parameters may be increased or reduced in a different unit.

Figure 10:
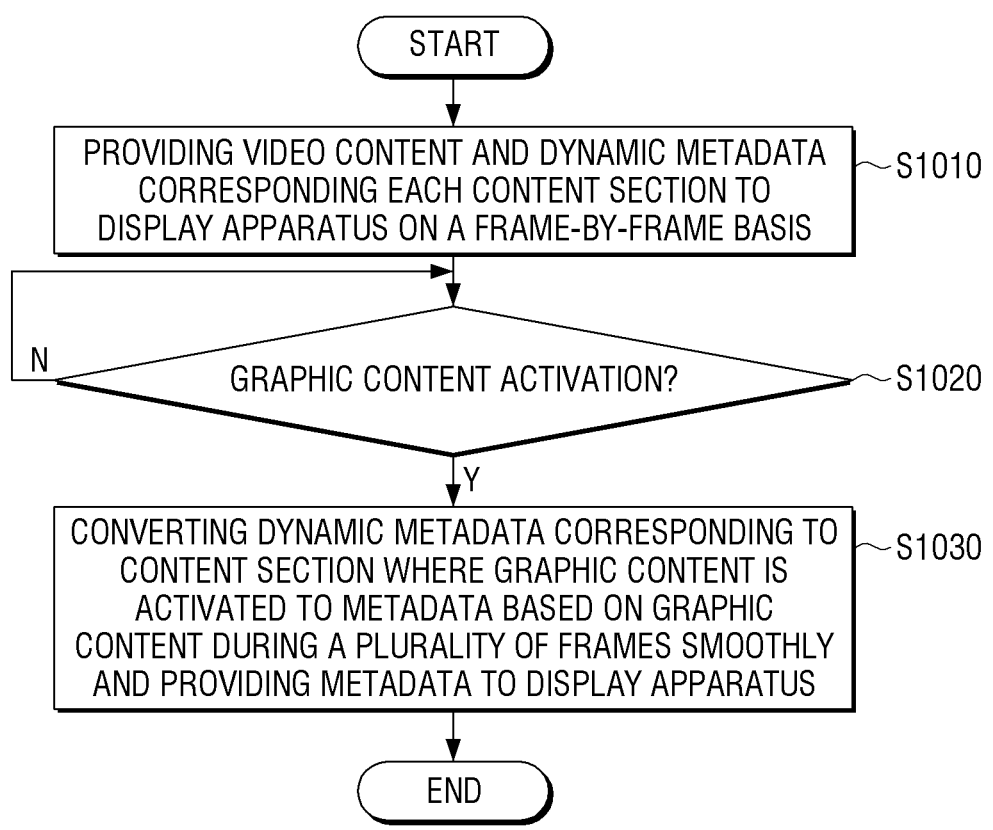
FIG. 10 is a flowchart provided to explain a controlling method for an electronic apparatus according to an embodiment of the present disclosure.

FIG. 10 is a flowchart provided to explain a controlling method for an electronic apparatus according to an embodiment of the present disclosure.

According to a controlling method for an electronic apparatus as shown in FIG. 10, a video content and dynamic metadata corresponding to each content section may be provided to an external display apparatus (including a display panel) in a frame unit at step S1010.

When a graphic content is activated at step S1020:Y, dynamic metadata corresponding to a content section where the graphic content is activated may be converted into static metadata during a plurality of frames and provided to the display apparatus at step S1030. The dynamic metadata may be gradually converted into the static metadata during a plurality of frames. The graphic content may include at least one of Interactive Graphic (IG), Presentation Graphic (PG) and Graphical User Interface (GUI).

At step S1010, metadata corresponding to the frames included in a plurality of frames may be obtained and provided by applying a predetermined weight value to metadata corresponding to each previous frame.

At step S1010, Application Programming Interface (API) included in the content may be called, and it is determined whether the graphic content is activated based on mode information included in the API.

At step S1010, metadata corresponding to the frames included in a plurality of frames may be obtained by calculating a sum of a value obtained by applying a predetermined first weight value to the metadata corresponding to the previous frame and a value obtained by applying a second weight value to preset reference data.

Metadata corresponding to the first frame included in a plurality of frames may be dynamic metadata corresponding to the content section where the graphic content is activated. Metadata corresponding to the last frame included in the plurality of frames may be data converted from the dynamic metadata based on static metadata of at least one of the video content and the graphic content.

The metadata corresponding to the last frame may be data obtained by converting at least a part of brightness information of a content included in the dynamic metadata, tone-mapping information, maximum brightness information of a mastering monitor, and RGM information of a content into at least a part of maximum brightness information of a content and maximum brightness information of a mastering monitor included in the static metadata.

As step S1010, metadata corresponding to the last frame may be obtained by calculating at least a part of maximum brightness information of a content included and the maximum brightness information of a mastering monitor in the static metadata according to a predetermined formula, and replacing at least a part of brightness information of a content included in the dynamic metadata, tone-mapping information, maximum brightness information of a mastering monitor, and RGB information of a content to the obtained calculation value.

A controlling method may further include, based on the graphic content being inactivated, converting the static metadata to the dynamic metadata corresponding to the content section during a plurality of frames gradually (or smoothly and providing the dynamic metadata to the display apparatus.

Figure 11:
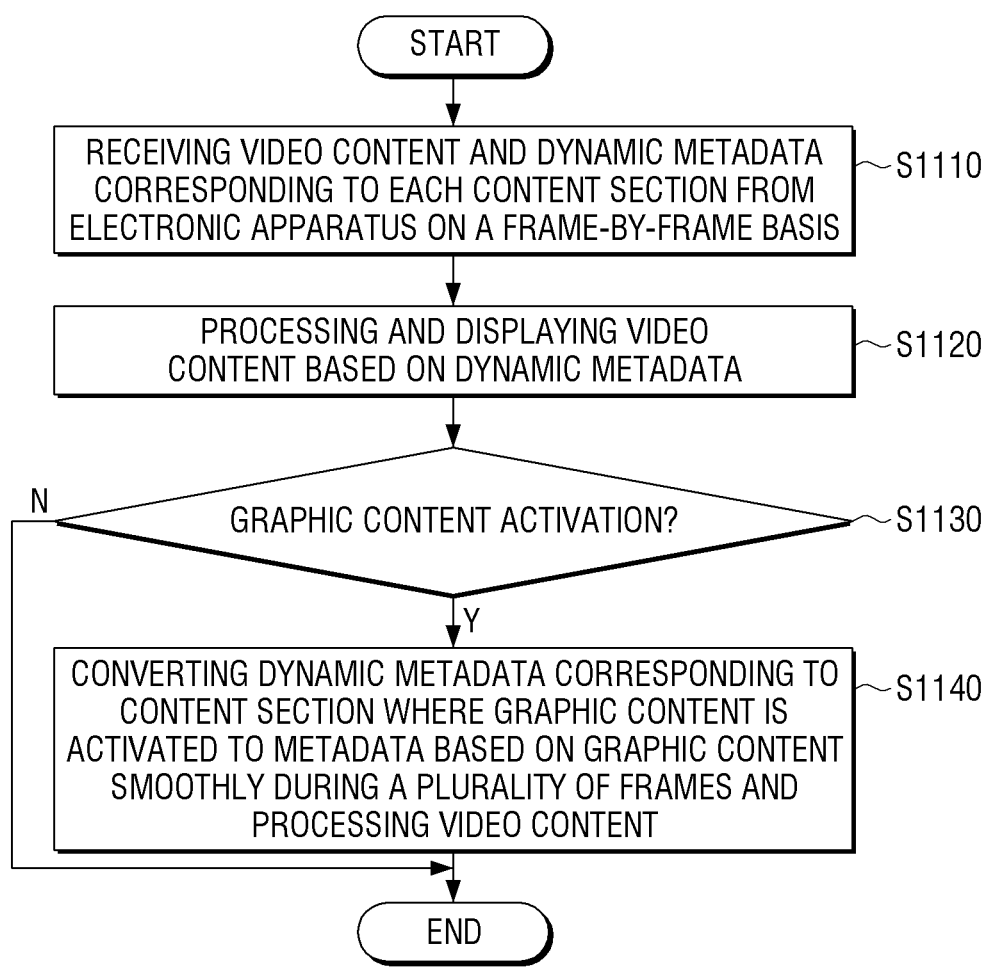
FIG. 11 is a flowchart provided to explain a controlling method for a display apparatus according to an embodiment of the present disclosure.

FIG. 11 is a flowchart provided to explain a controlling method for a display apparatus according to an embodiment of the present disclosure.

According to a controlling method for a display apparatus as shown in FIG. 11, a video content and dynamic metadata corresponding to each content section may be received from an electronic apparatus in each frame unit at step S1110.

The video content may be processed and displayed based on the dynamic metadata at step S1120.

In response to the graphic content being activated at step S1130:Y, the dynamic metadata corresponding to the content section where the graphic content is activated may be converted into the static metadata during a plurality of frames and the video content may be processed at step S940. The dynamic metadata may be gradually (or smoothly) converted into the static metadata during a plurality of frames. The graphic content may include at least one of Interactive Graphic (IG), Presentation Graphic (PG) and Graphical User Interface (GUI).

At step S1140, metadata corresponding to the frames included in a plurality of frames may be obtained by applying a predetermined weight value to the metadata corresponding to each previous frame.

At step S1140, metadata corresponding to the frames included in a plurality of frames may be obtained by calculating a sum of a value obtained by applying a predetermined first weight value to the metadata corresponding to the previous frame and a value obtained by applying a second weight value to predetermined reference data.

The metadata corresponding to the first frame included in a plurality of frames may be dynamic metadata corresponding to the content section where the graphic content is activated. The metadata corresponding to the last frame included in a plurality of frames may be data converted from the dynamic metadata based on the static metadata of at least one of the video content and the graphic content.

The metadata corresponding to the last frame may be data obtained by converting at least a part of brightness information of a content included in the dynamic metadata, tone-mapping information, maximum brightness information of a mastering monitor and RGB information of a content into at least a part of maximum brightness information of a content and maximum brightness information of a mastering monitor included in the static metadata.

At step S1140, metadata corresponding to the last frame may be obtained by calculating a value obtained by calculating maximum brightness information of the content and maximum brightness information of a mastering monitor included in the static metadata according to a predetermined formula, and replacing at least a part of brightness information of a content, tone-mapping information, maximum brightness information of a mastering monitor, and RGB information of the content included in the dynamic metadata to the obtained calculation value.

A controlling method may further include, in response to the graphic content being inactivated, converting the static metadata into the dynamic metadata corresponding to a content section gradually (or smoothly) during a plurality of frames and processing a video content.

According to various embodiments, brightness and color of the graphic content provided while the dynamic HDR content is displayed may be maintained.

The graphic content may be provided with the brightness and color of the graphic content as intended by a content creator.

Smooth transition of metadata may prevent or reduce an image degradation phenomenon such as flicker operation, sudden drop, etc.

According to various embodiments, the present disclosure may be embodied in the form of an application which could be amounted on at least one of the existing electronic apparatus and the display apparatus.

According to various embodiments, the present disclosure may be embodied by software upgrading or hardware upgrading on at least one of an existing electronic apparats or a display apparatus According to various embodiments, the present disclosure may be embodied through an embedded server provided in at least one of an electronic apparatus and a display apparatus, or an external server of at least one of an electronic apparatus or a display apparatus.

Meanwhile, the various embodiments described above may be implemented in a recording medium that can be read by a computer or a similar device using software, hardware, or a combination thereof. In some cases, the embodiments described herein may be implemented by the processor 120 or 230 itself. According to a software implementation, embodiments such as the procedures and functions described herein may be implemented in separate software modules. Each of the software modules may perform one or more of functions or operations described herein.

Meanwhile, computer instructions for performing the processing operations of the sound output apparatus 100 according to various embodiments of the present disclosure described above may be stored in a non-transitory computer-readable medium. The computer instructions stored in the non-volatile computer-readable medium may cause a specific apparatus to perform the processing operations in the sound output apparatus 100 according to the various embodiments described above when executed by the processor of the specific apparatus.

The non-transitory computer readable medium means a medium that semi-permanently stores data and is readable by a device, not a medium that stores data for a short time such as a register, a cache, a memory, etc. Specific examples of non-transitory computer readable medium may include CD, DVD, hard disk, Blu-ray disk, USB, memory card, ROM, and the like.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. An electronic apparatus, comprising:
a communication interface including interface circuitry; and
a processor configured to provide a video content and dynamic metadata corresponding to video content for each content period to an external display apparatus through the communication interface,
wherein the processor is further configured to:
based on at least one content period including graphic content, convert gradually the dynamic metadata into converted metadata during a plurality of frames in the at least one content period and provide the converted metadata to the external display apparatus during the at least one content period including the graphic content; and
wherein the converted metadata comprises a metadata obtained by a sum of a value obtained by applying a first weight value to the dynamic metadata and a value obtained by applying a second weight value to reference data.

2. The electronic apparatus as claimed in claim 1, wherein the converted metadata is static metadata that comprises tone mapping control data that maintains a fixed value which is not changed within the content period.

3. The electronic apparatus as claimed in claim 1, wherein the processor is further configured to obtain the converted metadata corresponding to each of a plurality of frames included in the at least one content period.

4. The electronic apparatus as claimed in claim 3, wherein the processor is further configured to call an Application Programming Interface (API) included in the video content, and determine whether the graphic content is activated based on mode information included in the API.

5. The electronic apparatus as claimed in claim 1, wherein metadata corresponding to a first frame of the plurality of frames comprises the dynamic metadata corresponding to the content period where the graphic content is activated, and
wherein metadata corresponding to a last frame of the plurality of frames comprises data obtained by converting the dynamic metadata based on static metadata of at least one of the video content and the graphic content.

6. The electronic apparatus as claimed in claim 5, wherein metadata corresponding to a last frame comprises data obtained by replacing at least a part of at least one of brightness information of a content, tone mapping information, maximum brightness information of a mastering monitor and RBG information of a content included in the dynamic metadata with at least a part of at least one of maximum brightness information of a content and maximum brightness information of a mastering monitor included in the static metadata.

7. The electronic apparatus as claimed in claim 1, wherein the processor is further configured to obtain metadata corresponding to a last frame by acquiring a calculation value by calculating at least a part of maximum brightness information of a content and maximum brightness information of a mastering monitor included in the static metadata according to a predetermined formula, and replacing at least a part of brightness information of a content, tone-mapping information, maximum brightness information of a mastering monitor, and RGB information of a content included in the dynamic metadata with the acquired calculation value.

8. The electronic apparatus as claimed in claim 1, wherein the processor is further configured to, based on the graphic content being inactivated, provide data to the display apparatus by gradually converting the static metadata into dynamic metadata corresponding to each content period during a plurality of frames.

9. The electronic apparatus as claimed in claim 1, wherein the graphic content includes at least one of interactive graphic (IG), presentation graphic (PG) and graphical user interface (GUI).

10. A display apparatus, comprising:
a communication interface including interface circuitry;
a display; and
a processor configured to, based on receiving a video content and dynamic metadata corresponding to video content for at least one content period including graphic content from an external electronic apparatus through the communication interface, process the video content based on the dynamic metadata and display the processed video content on the display,
wherein the processor is further configured to:
process the video content and graphic content based on converted metadata into which the dynamic metadata is converted during at least one content period including the graphic content, wherein the converted metadata comprises a metadata obtained by a sum of a value obtained by applying a first weight value to the dynamic metadata and a value obtained by applying a second weight value to reference data.

11. A controlling method for an electronic apparatus, the method comprising:
providing a video content and dynamic metadata corresponding to video content for each content period; and
based on at least one content period including graphic content, converting gradually the dynamic metadata into converted metadata during a plurality of frames in the at least one content period and providing the converted metadata to the external display apparatus during the at least one content period including the graphic content;
wherein the converted metadata comprises a metadata obtained by a sum of a value obtained by applying a first weight value to the dynamic metadata and a value obtained by applying a second weight value to reference data.

12. The method as claimed in claim 11, wherein the converting gradually the dynamic metadata comprises obtaining the converted metadata corresponding to each of a plurality of frames including in the at least one content period.

13. The method as claimed in claim 12, wherein the providing data to the external display apparatus comprises calling an Application Programming Interface (API) included in the video content, and identifying whether the graphic content is activated based on mode information included in the API.

14. The method as claimed in claim 11, wherein the converted metadata corresponding to a first frame of the plurality of frames comprises the dynamic metadata corresponding to the at least one content period including graphic content, and
wherein metadata corresponding to a last frame of the plurality of frames comprises data obtained by converting the dynamic metadata based on static metadata of at least one of the video content and the graphic content.

15. The method as claimed in claim 11, wherein the converted metadata corresponding to a last frame comprises data obtained by replacing at least a part of brightness information of a content, tone-mapping information, maximum brightness information of a mastering monitor, and RGB information of a content included in the dynamic metadata with at least a part of maximum brightness information and maximum brightness information of a mastering monitor included in the static metadata.

16. The method as claimed in claim 11, wherein the converting gradually the dynamic metadata comprises obtaining the converted metadata corresponding to a last frame by acquiring a calculation value by calculating at least a part of maximum brightness information of a content and maximum brightness information of a mastering monitor included in the static metadata according to a predetermined formula, and replacing at least a part of at least one of brightness information of a content, tone-mapping information, maximum brightness information of a mastering monitor, RGB information of a content included in the dynamic metadata with the acquired calculation value.

* * * * *